Sept. 14, 1965  R. C. BAILEY  3,206,027
APPARATUS FOR DETECTING LOSS OF VACUUM IN SEALED CONTAINERS
Filed May 27, 1963  2 Sheets-Sheet 1
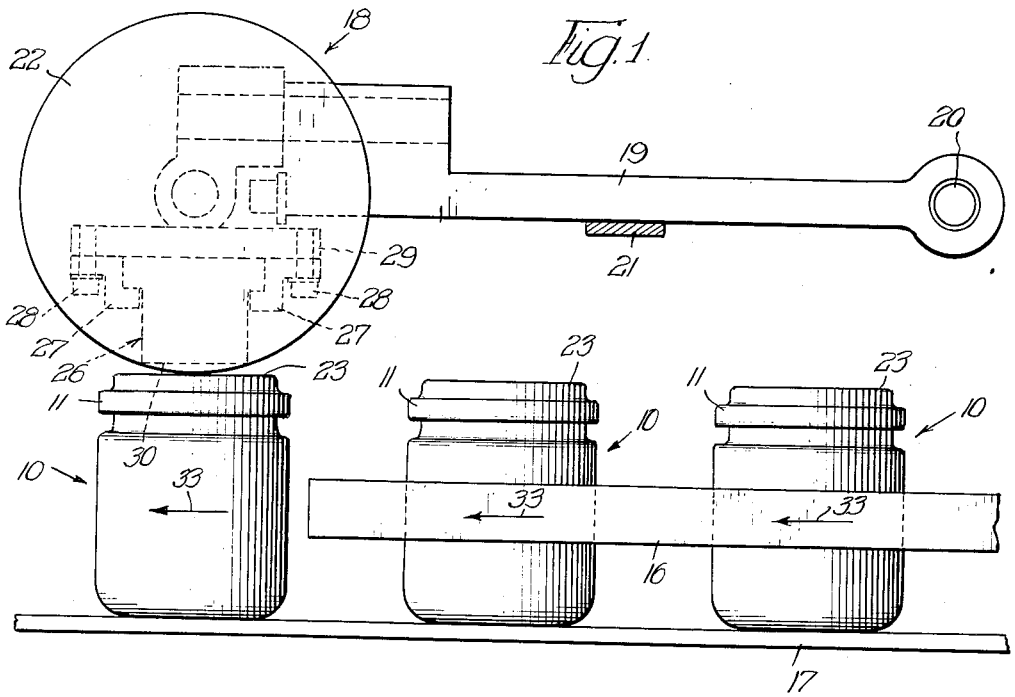
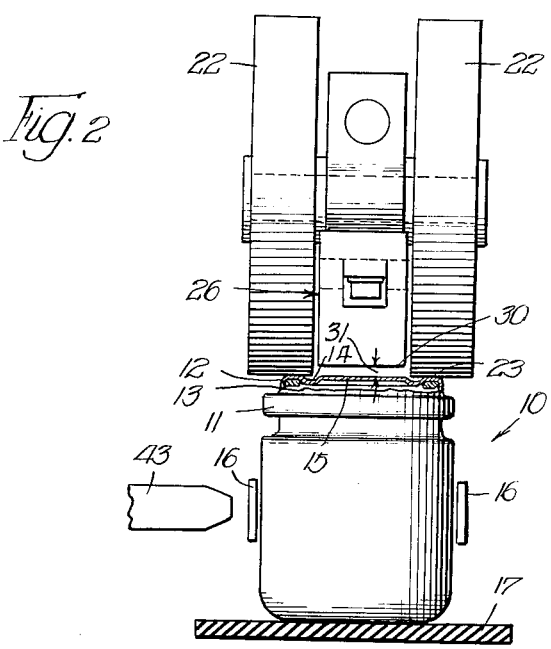
INVENTOR.
Ralph Charles Bailey,
BY Sept. 14, 1965    R. C. BAILEY    3,206,027
APPARATUS FOR DETECTING LOSS OF VACUUM IN SEALED CONTAINERS
Filed May 27, 1963    2 Sheets-Sheet 2

INVENTOR.
Ralph Charles Bailey,
BY

United States Patent Office 3,206,027
Patented Sept. 14, 1965

3,206,027
APPARATUS FOR DETECTING LOSS OF
VACUUM IN SEALED CONTAINERS
Ralph Charles Bailey, Rochester, N.Y., assignor to Continental Can Company, Inc., New York, N.Y., a corporation of New York
Filed May 27, 1963, Ser. No. 283,495
5 Claims. (Cl. 209—111.8)

This invention relates, generally, to magnetic testing apparatus and it has particular relation to such apparatus for detecting loss of vacuum in sealed containers.

It is conventional to pack material, such as foodstuff, under vacuum. For example, baby food is packed in glass jars or containers that are sealed with metal caps. The central portions of such caps are flexed downwardly by atmospheric pressure to a lower than normal elevation or height with respect to the peripheral portions, as long as the desired vacuum is maintained in the container. When the vacuum in the container is less than the normal amount or is completely missing, the central portion of the cap rises as it returns to its unflexed position. When this takes place, the container is considered a "dud" and should be discarded. Since containers of this character are processed at speeds ranging up to 2,000 per minute, it is desirable that means operable over such a range of speeds be provided for accurately detecting duds.

Accordingly, among the objects of this invention are: To provide an apparatus for quickly and accurately detecting the presence of a sealed container in which the vacuum has been reduced below a predetermined minimum; to accomplish this by measuring the height of the metal caps on the containers and detecting when such height exceeds a predetermined height; to distinguish between changes in height due to loss of vacuum and changes in height that are due to other causes and to determine whether or not a particular container is to be discharged; to accomplish this by a combination of measurements involving the change in height and the time that such change is maintained as the containers, one by one, are moved past the measuring device in the form of a detecting transducer that is electromagnetic in character; to perform the measurements by the generation of a unidirectional voltage whose amplitude corresponds to the excess height of a deflectable portion of the cap and whose time duration is related to the area of the deflectable portion of the cap; to compare this measurement voltage against standards which represent the normal height and area of the deflectable portion of the cap; and to reject a container only when the deflectable portion of its cap, usually the central portion, exceeds the normal height over a predetermined area by an amount which corresponds to a vacuum that is below the required vacuum in the container.

In the drawings:

FIGURE 1 is a view, in side elevation, showing a measuring device constructed in accordance with the invention for detecting loss of vacuum in containers, such as jars of baby food, as they are fed one by one past the measuring device;

FIGURE 2 is a view, in front elevation, of the measuring device and equipment shown in FIGURE 1, the conveyor belt being shown in section.

Figure 3A:
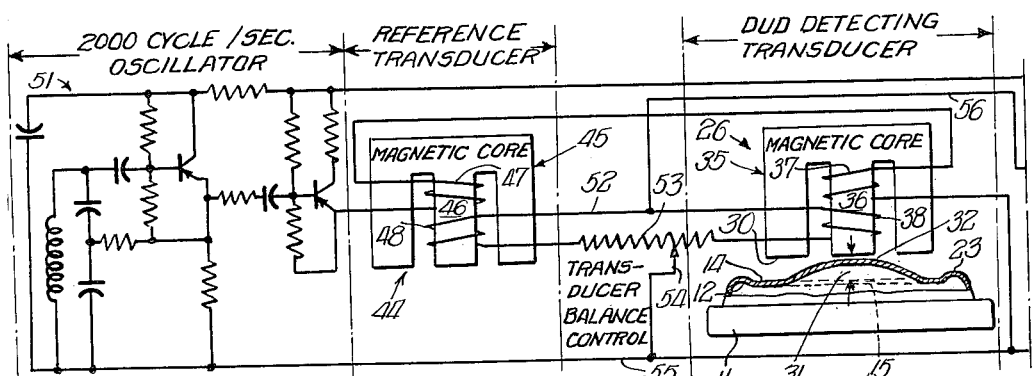
FIGURES 3A–B–C positioned in endwise relation in the order named illustrate diagrammatically the circuit connections that can be employed in practicing the present invention.

Referring now particularly to FIGURES 1 and 2 of the drawings, it will be observed that the reference character 10 designates, generally, a container that may be in the form of a glass jar for containing foodstuffs, such as baby food, and having a closure sealing the upper end in the form of a metal cap 11. The cap 11 has a downwardly opening peripheral groove 12 for receiving a gasket 13. Adjacent to the peripheral groove 12 is an upwardly opening annular groove 14 around a central portion 15 of substantially greater area than the area of that portion of the cap 11 which defines the peripheral groove 12.

The containers 10 are moved between side guides 16—16 by a conveyor belt 17 past a measuring device that is indicated, generally, at 18. As pointed out above, the containers 10 are moved at a constant speed which can range up to the order of 2,000 per minute. The measuring device 18 is mounted on a generally horizontally extending arm 19 that is pivoted at 20 about a horizontal axis. A stop 21 limits its downward movement. At the distal end of the arm 19 rollers 22—22 are mounted and are arranged to roll along the annular rib 23 that forms the peripheral groove 12 in the cap 11. Mounted between the rollers 22—22 is a detecting transducer that is indicated, generally, at 26. It is generally T-shaped, as viewed in FIGURE 1, and is held in position by clamps 27—27 that are secured by bolts 28—28 to a support 29 which is carried by the arm 19. This arrangement, as shown in FIGURE 2, provides that the lower surface 30 of the detecting transducer 26 is positioned a distance which is constant as measured to a plane containing the upper surface of the annular rib 23. It will be understood that, under normal vacuum conditions in the container 10, the upper surface of the central portion 15 is spaced from the lower surface 30 of the transducer 26 at least the distance indicated at 31.

In FIGURE 3A the normal vacuum condition position of the central portion 15 of the cap 11 is indicated by broken lines with the distance 31 being the same as described above. In the event that the vacuum in the container 10 is reduced below a predetermined value, the stresses present in the central portion 15 are such that it will elevate to the alternate full line position shown at 32. There will be a corresponding reduction in the distance between the upper surface of the central portion 15 and the lower surface 30 of the detecting transducer 26.

As seen in FIGURE 1, the containers 10 are fed, one by one, at a constant speed in the direction indicated by the arrows 33 by the conveyor belt 17 past the measuring device 18. The movement of one of the caps 11 is indicated by the arrow 34 in FIGURE 3A which illustrates how the cap 11 moves past the detecting transducer 26.

The detecting transducer 26 comprises an E-shaped laminated magnetic core that is indicated, generally, at 35. The legs extend downward and the central leg 36 has mounted thereon an energizing winding 37 and a measuring winding 38. As will appear hereinafter, the energizing winding 37 is connected to a source of relatively high frequency alternating current for inducing a voltage in the measuring winding 38 the magnitude of which is determined by the reluctance of the magnetic circuit of core 36 which is determined, in part, by the position of the central portion 15 of the cap 11 with reference to the lower surface 30.

Figure 3B:
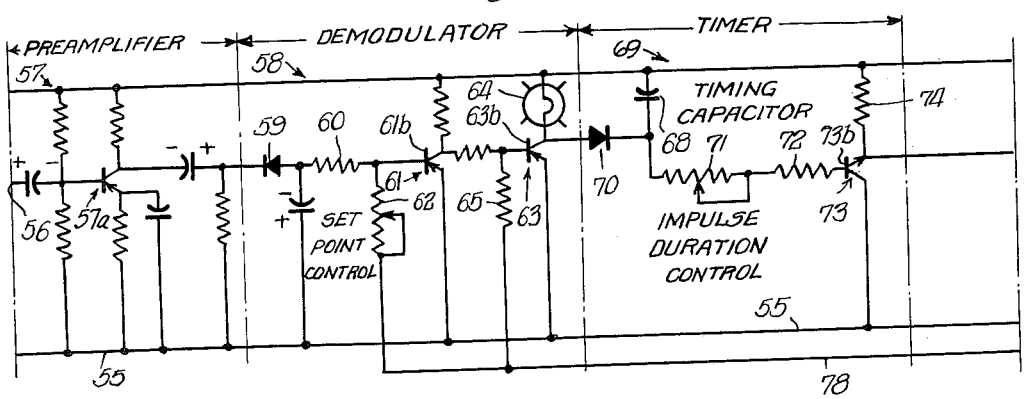
Figure 3C:
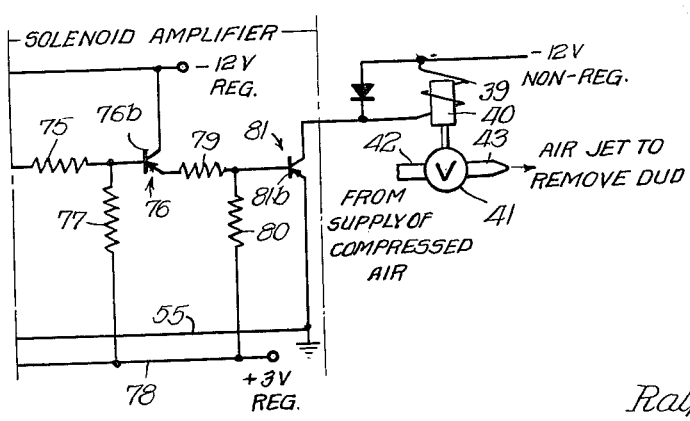

Upon the induction in the measuring winding 38 of a voltage in excess of a predetermined voltage, a solenoid 39, FIGURE 3C, is energized to attract an armature 40 and open an air valve 41. The air valve 41 is interposed between a supply conduit 42 that is connected to a source of compressed air and an air jet 43 which, as shown in FIGURE 2, is arranged to direct the blast of air against a container 10 for removing it from the conveyor belt 17. If the containers are small, the movement of the armature 40 may be used to directly knock them from the conveyor belt 17. If they are very large, an air control valve controlling an air cylinder may be disposed in place of the valve 41 for operation by the armature 40 and the piston of the air cylinder used to remove the large containers.

Positioned in a suitable housing apart from the measuring device 18 is a reference transducer that is indicated, generally, at 44 in FIGURE 3A. It will be understood that the major portion of the circuitry shown in FIGURES 3A–B–C is located apart from the detecting transducer 26 with suitable electrical connections therebetween as illustrated here.

The reference transducer 44 includes an E-shaped laminated magnetic core, shown generally at 45, which is substantially equivalent to the magnetic core 35. It has a central leg 46 on which energizing winding 47 and a measuring winding 48 are positioned. It will be observed that the energizing windings 37 and 47 of the transducers 26 and 44 are connected in series circuit relation, and for energization, to a transitorized oscillator that is indicated, generally, at 51. Preferably the oscillator 51 is arranged to operate at a frequency of the order of 2,000 cycles per second. It will be understood that other frequencies can be employed depending upon line speed. Too low a frequency might allow a container to pass at high speeds. Therefore, speeds of greater than 2,000 a minute may be realized at higher frequencies. The speed is limited only by the speed at which the ejecting device is capable of operating.

The measuring windings 38 and 48 are connected in a bridge circuit by a conductor 52 and a transducer balance control potentiometer 53. An adjustable connection 54 to the potentiometer 53 connects it to a grounded conductor 55. It will be understood that alternating voltages are induced in the measuring windings 38 and 48 by the energizing windings 37 and 47. By properly adjusting the potentiometer 53 by means of the adjustable connection 54 the bridge circuit is adjusted so that negligible alternating voltage appears between the adjustable connection 54 or the conductor 55 and a conductor 56 which is connected to the opposite side of the bridge circuit. The adjustment of the potentiometer 53 is such that, as long as the caps 11, which move underneath the detecting transducer 26 have the central portion 15 at normal height, represented by the broken line showing in FIGURE 3A, a negligible alternating voltage appears across the bridge circuit or between the conductor 56 and the adjustable connection 54 or conductor 55.

The output of the bridge circuit as applied by the conductor 56 comprises the input to a preamplifier that is indicated, generally, at 57. Preferably the preamplifier 57 has a gain of the order of 100 and includes a transistor 57a as illustrated. It will be understood that other amplifiers can be employed having a different gain.

The alternating current output of the preamplifier 57 is applied to a transistorized demodulator that is indicated, generally, at 58. The demodulator 58 includes a rectifier 59 which converts the 2,000 cycle signal from the preamplifier 57 to a direct voltage, the magnitude of which corresponds to the magnitude of the alternating voltage that appears across the bridge circuit in which the measuring windings 38 and 48 are connected. The rectified signal is fed through a resistor 60 in the demodulator 58 to a base 61b of a transistor that is indicated, generally, at 61. The transistor 61 is biased to the non-conducting state by a positive voltage that is applied through a set point control potentiometer 62. By means of the potentiometer 62 it is possible to adjust the value of the unidirectional voltage that is required to be applied to the base 61b of the transistor 61 to render it conducting. Thus not only must a unidirectional voltage be applied to the base 61b of the transistor 61 to render it conducting, but also it must be of a magnitude which is determined by the setting of the potentiometer 62. Such an error signal is a function of the alternating voltage that appears across the bridge circuit in which the measuring windings 38 and 48 are connected. Accordingly, by proper adjustment of the potentiometer 62 variations in the reluctance of the magnetic circuit of core 35 of the detecting transducer 26 caused by variations in the caps 11, not due to loss of vacuum in the respective container, are ineffective to overcome the biasing voltage applied to the base 61b of the transistor 61.

The transistor 61 is arranged to control the voltage applied to a base 63b of a transistor 63 which normally is conducting and which has in series therewith an indicating lamp 64. As long as the transistor 63 is maintained in the conducting state, the indicating lamp 64 is lighted. This indicates that the alternating voltage applied across the bridge circuit including the measuring windings 38 and 48 is insufficient to produce the necessary rectified unidirectional voltage at the base 61b of the transistor 61 for the given setting of the potentiometer 62 to render the transistor 61 conducting.

When the reluctance of the magnetic circuit of core 35 of the transducer 26 is decreased a predetermined amount, such as by the elevation of the central portion 15 of the cap 11 to the positioned indicated at 32 in FIGURE 3A, a corresponding increase in alternating voltage is induced in the measuring winding 38 and there is a corresponding increase in the alternating voltage across the bridge circuit. This alternating voltage is applied between the conductors 55 and 56 and is amplified by the preamplifier 57 and rectified by the rectifier 59 in the demodulator 58. It is assumed that the rectified voltage is sufficient to overcome the biasing voltage applied to the base 61b of the transistor 61, as set by the potentiometer 62 with the result that the transistor 61 becomes conducting. The base 63b of the transistor 63 is now driven positive through the resistor 65. The transistor 63 ceases to conduct and the indicating lamp 64 is extinguished.

Depending upon the duration of extinction of the indicating lamp 64, a signal may be generated which is sufficient to effect the energization of the solenoid 39. The time that the signal appears is measured by a timing capacitor 68 which forms a part of a timer that is indicated, generally, at 69. As long as the transistor 63 remains conducting and the indicating lamp 64 remains energized or lighted, a charging voltage is applied through a rectifier 70 to charge the timing capacitor 68. After the transistor 63 is rendered non-conducting, the charging voltage applied to the capacitor 68 is removed. However, it cannot discharge through the indicating lamp 64 because of the rectifier 70. The timing capacitor 68 discharges through an impulse duration control potentiometer 71 and a resistor 72 in series therewith and connected to a base 73b of a transistor, shown generally at 73, that normally is conducting. The transistor 73 is energized through a resistor 74 and thus the voltage at the junction therebetween is maintained relatively low with respect to the conductor 55. The time required for the capacitor 68 to discharge is determined by the adjustment of the potentiometer 71. The time interval through which the control voltage is applied to the base 73b during the discharge of the capacitor 68 is determined by its capacitance and the resistance of the potentiometer 71 and resistor 72 in series therewith. Should the signal received by the demodulator 58 be of relatively short duration, the indicating lamp 64 will again be illuminated and the charging of the capacitor 68 will be continued. Thus it requires a signal of predetermined time length to cause the capacitor 68 to discharge sufficiently to decrease the voltage applied to the base 73b of the transistor 73 and render it non-conducting.

The transistor 73 through a resistor 75 controls the operation of a transistor that is indicated, generally at 76. The base 76b of the transistor 76 is connected through a resistor 77 to conductor 78 to which a biasing voltage is applied as indicated. Normally, the transistor 76 is in the non-conducting state. However, upon the transistor 73 being rendered non-conducting as the result of the discharge of the timing capacitor 68 for a sufficient length of time, it will be rendered conducting. When the transistor 76 conducts, current flows through resistors 79 and 80 whose junction is connected to a base 81b of a transistor 81 that is connected with the solenoid 39 that controls the operation of the air valve 41. The transistor 81 is thereby rendered conducting and the solenoid 39 is energized.

The system is automatically reset as soon as the central portion 15 in the alternate position at 32 corresponding to a defective container 10 or "dud" is moved out from registry with the transducer 26. The transistor 63 is rendered conducting, the lamp 64 is energized, capacitor 68 is recharged and solenoid 39 is deenergized in time to measure the height of the central portion 15 of the next container 10.

Upon energization of the solenoid 39, the air valve 41 is opened. Compressed air is directed by the air jet 43 against the defective container 10 and it is removed from the conveyor 17.

By properly adjusting the transducer balance control potentiometer 53, and the set point control potentiometer 62, it is possible to select for ejection only those containers 10 having caps 11 with the central portion 15 located at a predetermined height with reference to the normal height. Also, by properly adjusting the impulse duration control potentiometer 71, it is possible to prevent energization of the solenoid 39 except under those conditions where the elevated portion of the cap 11 is capable of reducing the reluctance of the detecting transducer 26 for a length of time sufficient to discharge the capacitor 68, and thus prevent a false operation. Thus it is possible to distinguish from variations in reluctance which are insufficient to generate sufficient alternating voltage applied to the demodulator 58 to overcome the setting of the set point control potentiometer 62. By proper adjustment of the impulse duration control potentiometer 71, even if the reduction in reluctance caused by a cap 11 is sufficient to cause the required change in alternating voltage, unless this voltage is maintained for the corresponding length of time, it will be ineffective to cause energization of the solenoid 39. As a result the system is insensitive to normal variations in the configuration of the metal cap 11 as it moves underneath the magnetic core 35 of the detecting transducer 26 and also is insensitive to variations in height of portions of the cap 11 which, while sufficient to cause the required change in alternating voltage for detection, are insufficient in time duration to maintain the error signal for a period, as determined by the timing circuit 69, sufficient to render the transistor non-conducting and thus initiate the sequence of operations leading to the energization of the solenoid 39.

It is to be understood that when the caps 11 are made of ferrous metal, the reluctance of the magnetic circuit of the core 35 will be changed by a substantial amount due to the presence of such a cap under the core 35. However, if the caps are made of aluminum or an alloy of a non-ferrous nature generally used for making caps, the change in the reluctance of the magnetic circuit will be appreciable, that is, sufficient to provide satisfactory operation if a stage of phase inversion is added after 63b.

What is claimed as new is:
1. A system for determining the degree of variation in height of portions of metal closure members on sealed containers due to variation in vacuum therein comprising:
   (a) a detecting transducer having a magnetic circuit including a magnetic core adapted to be associated with said closure members, one by one, whereby the reluctance of the magnetic circuit of said core is varied depending upon the position with respect thereto of said portion of a closure member,
   (b) a reference transducer having a magnetic core substantially equivalent to said magnetic core of said detecting transducer,
   (c) first and second winding means on the magnetic core of each of said transducers,
   (d) means for energizing said first winding means from an alternating current source whereby an alternating voltage is induced in the respective second winding means according to the reluctance of the respective magnetic circuit of each core,
   (e) circuit means connecting said second winding means in a bridge circuit, and
   (f) means connected across said bridge circuit and responsive to the alternating voltage thereacross resulting from the presence of said portion of a closure member adjacent the magnetic core of said detecting transducer.
2. The invention, as set forth in claim 1, wherein the system includes:
   (a) means for feeding the sealed containers, one by one, past the detecting transducer,
   (b) means for removing a selected container from said feeding means, and
   (c) means responsive only to the existence of a predetermined voltage across the bridge circuit for a predetermined time for operating said container removing means to remove a container having the height of the portion of the closure member varying with the vacuum therein above a predetermined height.
3. The invention as set forth in claim 2, wherein the means for operating the container removing means includes:
   (a) means for rectifying the alternating voltage across the bridge circuit,
   (b) capacitor means connected to said rectifying means and charged to a predetermined potential as long as the rectified alternating voltage remains below a predetermined value, and
   (c) means responsive to rise of said rectified voltage above said predetermined value for a time measured by discharge of said capacitor for effecting energization of said container removing means.
4. A system for determining the degree of variation in height of portions of metal closure members on sealed containers due to variation in vacuum therein comprising:
   (a) a detecting transducer having a magnetic circuit including a magnetic core adapted to be associated with said closure members, one by one, whereby the reluctance of the magnetic circuit of said core is varied depending upon the position with respect thereto of said portion of a closure member,
   (b) a reference transducer having a magnetic circuit including a magnetic core substantially equivalent to said magnetic core of said detecting transducer,
   (c) a first winding on each magnetic core connected in series circuit relation with each other and for energization to a source of alternating current,
   (d) a second winding on each core inductively related to the first winding thereon and into which an alternating voltage is induced according to the reluctance of the magnetic circuit of the respective core,
   (e) circuit means connecting said second windings in a bridge circuit, and

(f) means connected across said bridge circuit and responsive to the alternating voltage thereacross resulting from the presence of said portion of a closure member adjacent the magnetic core of said detecting transducer.

5. The invention, as set forth in claim 4, wherein the source of alternating current operates at a frequency in accordance with the number of metal closure members per unit time passing the detector transducer.

References Cited by the Examiner

UNITED STATES PATENTS

| 2,791,730 | 5/57 | Stout | 317—142 |
| 2,896,784 | 7/59 | Greenamyer | 209—82 |
| 3,050,662 | 8/62 | Miller | 317—153 X |
| 3,052,827 | 9/62 | Olsen | 317—153 X |
| 3,064,807 | 11/62 | Stover | 209—82 X |

ROBERT B. REEVES, *Acting Primary Examiner.*